United States Patent [19]

Hertz

[11] 4,346,387

[45] Aug. 24, 1982

[54] METHOD AND APPARATUS FOR CONTROLLING THE ELECTRIC CHARGE ON DROPLETS AND INK-JET RECORDER INCORPORATING THE SAME

[76] Inventor: Carl H. Hertz, Skolbänksvägen 8, S-223 67 Lund, Sweden

[21] Appl. No.: 212,115

[22] Filed: Dec. 2, 1980

[30] Foreign Application Priority Data

Dec. 7, 1979 [SE] Sweden ............................ 7910088
Feb. 5, 1980 [SE] Sweden ............................ 8000880

[51] Int. Cl.$^3$ ............................ G01D 15/18

[52] U.S. Cl. ............................ 346/1.1; 346/75; 118/624

[58] Field of Search ............................ 346/75, 1.1; 239/706; 118/624

[56] References Cited

U.S. PATENT DOCUMENTS 3,060,429 10/1962 Winston ............................ 346/75 X
3,579,245 5/1971 Berry ............................ 346/75
3,769,625 10/1973 Gunn ............................ 346/75 X
4,231,047 10/1980 Iwasaki ............................ 346/75

*Primary Examiner*—Joseph W. Hartary
*Assistant Examiner*—S. D. Schreyer

[57] ABSTRACT

Method and apparatus for controlling the electric charge on droplets formed by the breaking up of a pressurized liquid stream at a drop formation point located within an electric field. The field is provided to have an electric potential gradient and means are provided to effect drop formation at a point in the field corresponding to the desired predetermined charge to be placed on the droplets at the point of their formation. The location of the drop formation point within the charging field may be controlled by one or more signals applied to various components of the apparatus. The method and apparatus are particularly suited to ink-jet recording systems.

57 Claims, 11 Drawing Figures

Fig. 1 A
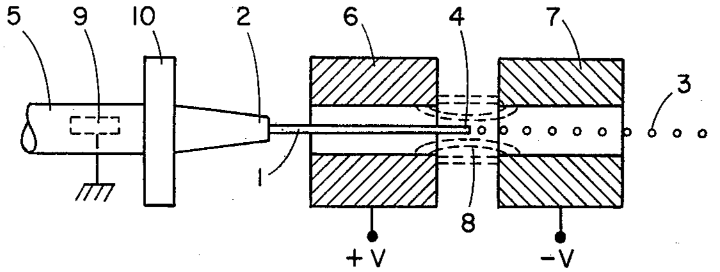
Fig. 1 B
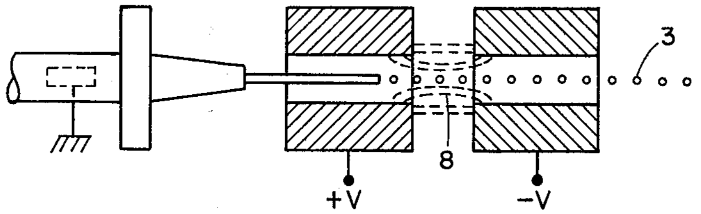
Fig. 1 C
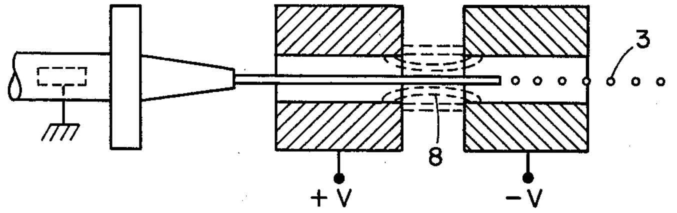
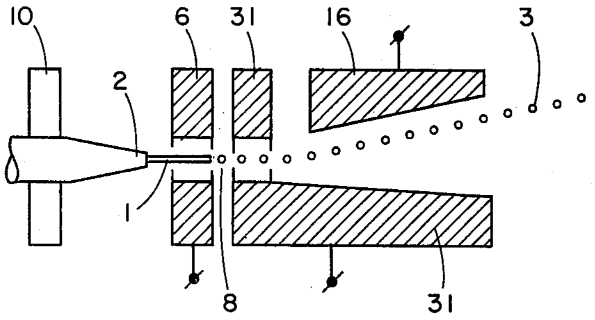
Fig. 4

METHOD AND APPARATUS FOR CONTROLLING THE ELECTRIC CHARGE ON DROPLETS AND INK-JET RECORDER INCORPORATING THE SAME

This application claims the priority of Swedish applications Ser. Nos. 7910088-9 and 8000880-9 filed Dec. 7, 1979 and Feb. 5, 1980, respectively, under 35 U.S.C. 119.

This invention relates to ink jet printing and more particularly to method and apparatus for controlling the electric charge on the liquid droplets used in such printing.

During the past 15 years electrically controlled fluid jets have found many new fields of application. This is especially true for the printing industry where fine, electrically controlled ink jets are used for the printing of alphanumeric characters and images. Since the characters written by such an ink-jet printing device are determined by electric control signals which influence the jet, such printing devices are especially suited for fast print-out, for example, of alphanumeric characters from computers.

Several different ink-jet methods and apparatus have been developed for this purpose, two of which work with a continuous jet of an electrically conductive fluid. These methods are described by Sweet in U.S. Pat. No. 3,596,275 and by Hertz and Simonsson in U.S. Pat. No. 3,416,152. (U.S. Pat. No. 3,298,030) and Hertz (U.S. Pat. No. 3,737,914) have also shown how alphanumeric characters can be printed with modification in the methods originally proposed by Sweet and Hertz et al., respectively. In both of these modifications the direction of the ink jet is changed during the printing process. Lewis, as well as Sweet, uses a stationary nozzle while Hertz oscillates the nozzle mechanically in a way earlier described by Elmqvist in U.S. Pat. No. 2,566,443. Both of these prior art methods make use of the fact that an electrically conductive fluid jet continuously emerging from a nozzle under high pressure, breaks up into discrete droplets at the so-called drop formation point. The electric charge on the drops, once formed, can be determined by an electric signal voltage connected to a control electrode located in the immediate vicinity of the point of drop formation.

However, both of these prior art methods have several disadvantages which limit and hamper their usefulness. The method of Sweet and Lewis is based on the fact that the droplets can be guided exactly towards a predetermined position on the recording paper with the aid of a transversal electric DC field. In this case, however, the mass and electric charge on the drops must be exactly determined. While the mass of the drops can easily be kept constant with the aid of mechanical vibrations from an ultrasonic crystal, it is very difficult to control the charge on the drops at the moment of their formation (IBM J. Res. Dev. 21 No. 1, 1977). Therefore different methods to solve this problem are described in several patents, but so far as is known, no simple and reliable solution has been found.

Hertz (U.S. Pat. No. 3,737,914) produces his oscillating liquid jet by mechanically oscillating the nozzle back and forth. Since the oscillating system has a relatively low upper frequency limit the printing speed of this method is limited. Furthermore, for many reasons it would be advantageous if the liquid jet could be oscillated in a saw-tooth pattern instead of in a sine-wave pattern perpendicular to its direction of travel. In this way more ink could reach the recording paper and the problems of synchronizing the electric signals with the mechanical oscillation of the jet direction could be avoided. These problems are discussed by Rolf Erikson in the paper "Ink Jet Printing with Mechanically Deflected Jet Nozzles" (Report 1/75, Dept. Electr. Measurements, Lund Institute of Technology). Furthermore, the oscillation of a nozzle in the generation of a so called "compound jet", described by Hertz in U.S. Pat. No. 4,196,437, presents some difficulties.

It is therefore a primary object of this invention to provide an improved method to control the electric charge on liquid droplets which are formed from a liquid stream at a drop formation point. It is another object to provide a method of the character described which may be used to oscillate the liquid droplet jet at a high frequency prependicular to the jet direction according to a predetermined pattern. Still another object is to provide such a method which may be used to modulate the intensity of the liquid droplet jet to write characters or do bar code printing. It is yet a further object to provide an improved method of controlling the electric charge on liquid droplets, the method being highly flexible in its application to a wide variety of ink-jet systems, including those using a compound jet.

It is another primary object of this invention to provide improved apparatus for controlling the electric charge on liquid droplets which are formed from a liquid stream at a drop formation point. It is another object to provide apparatus of the character described which makes it possible to oscillate a liquid droplets jet at a high frequency and which requires neither the precise controlling of the electric charge on each individual drop at the moment of its formation nor the mechanical oscillation of the nozzle from which the liquid stream forming the droplets is directed. A further object of this invention is to provide such apparatus which may be used to modulate the intensity of a liquid droplet jet in an ink-jet printer to write characters or to do bar code printing. It is yet another object to provide unique and improved ink-jet printers and systems incorporating the apparatus of this invention. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

According to one aspect of this invention there is provided a method of creating a stream of liquid droplets which carry thereon electric charges of predetermined magnitude and polarity, comprising the steps of providing an electrically conductive liquid jet which breaks up at a drop formation point to form liquid droplets; providing an electric field, through which the droplets are directed, having an electric potential gradient; and controlling the location of the drop formation point within the electric field along the gradient thereby to control the electric charge on the droplets.

According to another aspect of this invention there is provided a method of ink-jet printing, comprising the steps of forcing an electrically conductive liquid under pressure through a nozzle to form a jet of the liquid which breaks up into a jet of liquid droplets at a drop formation point; directing the liquid jet through an electric field having an electric potential gradient; controlling the location of the drop formation point within the electric field along the gradient thereby to place on the droplets electrical charges of predetermined polarity and magnitude; and electrically controlling the direction of travel of the charged droplets whereby selected ones of the droplets are directed onto a receptor surface in a predetermined pattern.

In a preferred embodiment of the method of this invention the electric field gradient is along the direction of liquid jet travel.

According to a further aspect of this invention there is provided an apparatus for creating a stream of liquid droplets having predetermined electrical charges thereon, comprising, in combination, nozzle means; means to eject a liquid jet under pressure from the nozzle means in a manner to break up the liquid jet into droplets at a drop formation point thereby to form a jet of liquid droplets; droplet control electrode means arranged to define an electric field through which the liquid jet is directed and in which the drop formation point is located, the electric field having an electric potential gradient; and means to control the location of the drop formation point within the electric field along the gradient thereby to control the electric charge on the droplets.

According to yet another object of this invention there is provided an apparatus for ink-jet printing, comprising in combination nozzle means; means to define an electric droplet charging field having an electric potential gradient; means to supply under pressure an electrically conductive liquid from a source through conduit means and through the nozzle thereby to form a liquid jet which travels through the electric field and which breaks up into liquid droplets at a drop formation point located within the electric field; means to control the location of the drop formation point within the electric field along the gradient thereby to place on the droplets electrical charges of predetermined polarity and magnitude; receptor surface means; and droplet directing electrode means to control the direction of travel of the droplets whereby selected ones of the droplets are directed onto the receptor surface means in a predetermined pattern.

For a fuller understanding of the nature and objects of the invention, reference should be had to the following detailed description taken in connection with the accompanying drawing in which FIGS. 1A, 1B, 1C illustrate how the electric charge on a liquid droplet is dependent upon the position of the drop formation point in an electric field;

FIGS. 4 and 5 are cross sectional views of alternative electrode systems usable in the practice of this invention;

Figure 9:
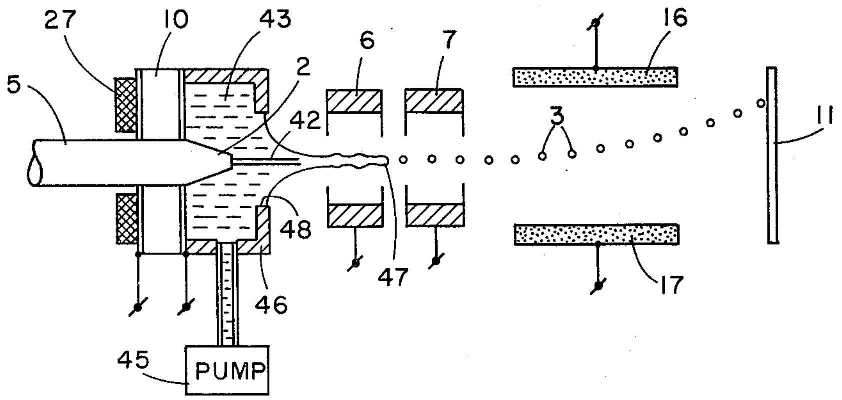
Figure 7:
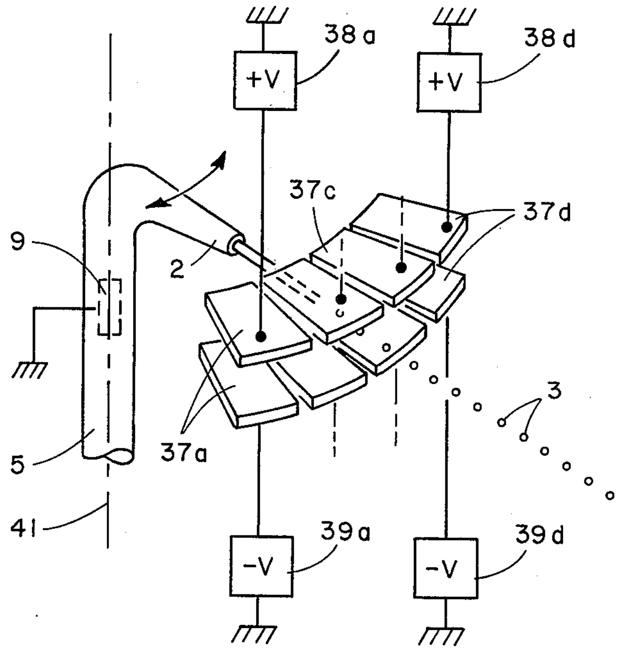
Figure 8:
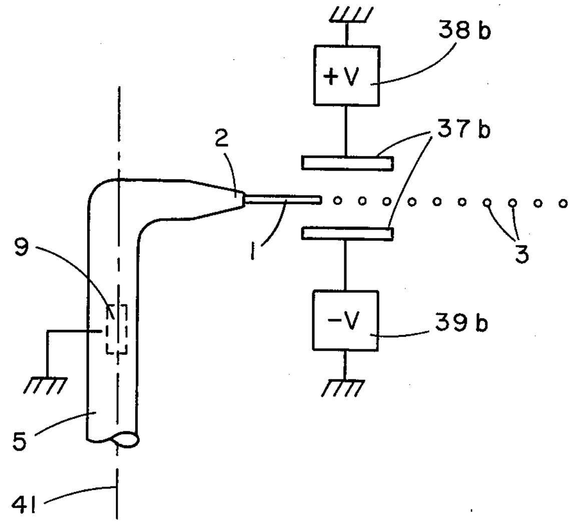

FIGS. 7 and 8 are perspective and side elevational views, respectively, of another embodiment of the method and apparatus of this invention in which the locii of drop formation points lie on an arc which has means to mechanically oscillate the direction of the droplets jet in a varying electric field; and FIG. 9 diagrammatically illustrates the application of the compound jet principle to the method and apparatus of this invention.

In the previously described prior art methods of Sweet and Hertz et al, the electric charge on the drops at the point of drop formation is determined by the value of the electric signal voltage connected to a characteristically annularly-shaped control electrode situated close to or surrounding the point of drop formation. (This is also described by Kamphoefner in "Ink Jet Printing" in IEEE Transactions on Electron Devices ED-19, April 1972, page 584.)

Contrary to this prior art method, in the present invention the magnitude and polarity of the charge are determined by the geometric position of the point of drop formation relative to an electric field. The field is preferably maintained between two electrodes. FIG. 1 presents three diagrams A, B and C illustrating how the principle of this invention is realized.

As shown in FIG. 1A, an electrically conductive liquid jet emerges from a nozzle 2 at high speed and, in a known manner, breaks up into separate droplets 3 at the drop formation point 4. The jet is generated continually by providing the liquid under constant pressure through the conduit 5 to nozzle 2. Liquid jet 1 is directed to pass through the center of two annular electrodes 6 and 7, the common center lines of which essentially coincide with the direction of liquid jet travel. In the following detailed explanation it is important to keep in mind that the locii of the drop formation points are situated along the line of travel of liquid jet 1 and within or between electrodes 6 and 7, as shown in FIGS. 1A–1C.

If electrodes 6 and 7 are connected to two voltage sources with voltages $+V_1$ and $-V_2$, an electric field 8 is generated between and partly inside electrodes 6 and 7. Liquid jet 1 is introduced into field 8 in such a way that the drop formation point is located within it. In keeping with ink-jet practice, the liquid of liquid jet 1 is electrically conductive and in contact with ground through an electrode 9 to conduit 5. In consequence, drop formation point 4 as well as droplets 3 are electrically charged.

In contrast to the prior art methods of Sweet and Hertz et al, the value of the droplet charge is dependent not only upon the value of the signal voltages $V_1$ and $V_2$, but also upon the location of the drop formation point 4 relative to annular electrodes 6 and 7 and thereby also relative to its position in electric field 8.

The following example, which is cited as illustrative and not limiting, is offered as a further explanation of the principle on which the method and apparatus of this invention are based. Assume for this purpose that $V_1$ is $+100$ and $V_2$ is $-100$ constant DC voltage to ground. If drop formation point 4 lies midway between the two electrodes 6 and 7, as shown in FIG. 1A, the drops are not charged at all since the electric potential to ground is zero. However, if drop formation point 4 is shifted into electrode 6 as shown in FIG. 1B, the drops are strongly negatively charged because of the positive potential of electrode 6. From FIG. 1C it can be seen that the opposite occurs if the drop formation point 4 lies within electrode 7. In this latter case, the drops are positively charged since electrode 7 has a negative voltage.

In this example, the potential of the electric field between electrodes 6 and 7 varies continuously along the axis of liquid jet 1 from a positive value to a negative one. Since the actual electric charge on the droplets is dependent upon where the droplets are formed, i.e., the location of the drop formation point 4, the charge on the droplets can be continuously varied by moving the drop formation point along the liquid jet axis. It will be appreciated that the explanation given here is somewhat simplified, since electric field 8 between electrodes 6 and 7 is somewhat distorted by the continuity of the liquid jet which extends from the outlet of nozzle 2 to drop formation point 4. Since the liquid is electrically conductive and at ground potential, it can affect the field pattern of the electric field lines between the electrodes. Practically, however, this does not cause any change in the above explanation. To simplify the following description of the invention "electric field 8" always refers to that field in which the drop formation point is located, and the field-distorting effect of the liquid jet 1 is not taken into account.

The distance between nozzle 2 and drop formation point 4 is constant if the speed, viscosity and surface tension of the liquid in the stream remain unchanged. Therefore the drop formation point could be moved by mechanically moving nozzle 2 back and forward along the liquid jet axis. However, because of the mass of nozzle 2 and conduit 5 such a movement can not be effected with any great frequency; and thus it is much more advantageous to move the point of drop formation by other means. Examples of how this may be done are given below.

It is well known that the formation of droplets from a liquid stream can be controlled by mechanical vibrations supplied to the liquid jet 1 through nozzle 2. This is most easily done by using a piezoelectric crystal 10 in effective mechanical contact with conduit 5. If an electric AC voltage is applied to the electrodes of crystal 10, it will cause mechanical oscillations or vibrations in a well-known way. These vibrations are transmitted via conduit 5 to nozzle 2 and jet 1, and they affect the process of drop formation if the vibrating frequency is approximately the same as the natural drop formation frequency of the liquid jet. The effect of the vibrations on the liquid jet causes the drop formation frequency to be equivalent to the vibration frequency and supports the drop formation process itself. The net result is that drop formation takes place closer to the nozzle when such mechanical vibrations are applied to the liquid in conduit 5 than when they are not. It has been found that the location of the drop formation point is dependent upon the amplitude of these mechanical vibrations, and, therefore, it is possible to predetermine the position of drop formation point 4 by the amplitude of the AC voltage signal exciting crystal 10.

Therefore, one embodiment of the invention uses the above described fact that the position of drop formation point 4 in an electric field 8 can be controlled by a suitable choice of amplitude of the AC voltage which excites crystal 10. This renders it possible to control the charge on droplets 3. Since all of the droplets have equal mass because of the crystal vibrations they can, in their motion towards the receptor surface 11, e.g., recording paper, be deflected in an electric deflection field situated essentially perpendicular to the liquid jet direction in such a way that they hit receptor surface 11 at predetermined points. The direction of the jet of droplets can thus be controlled by controlling the amplitude of the AC voltage.

Figure 2:
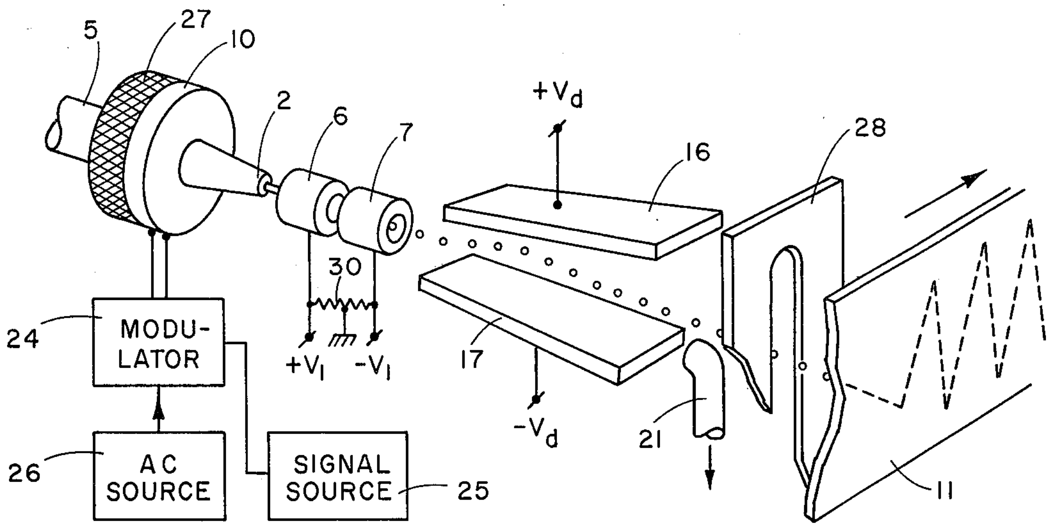
FIGS. 2 and 3 are perspective and cross sectional views, respectively, of one embodiment of the apparatus of this invention incorporating both droplet control means and deflection plate means.
Figure 3:
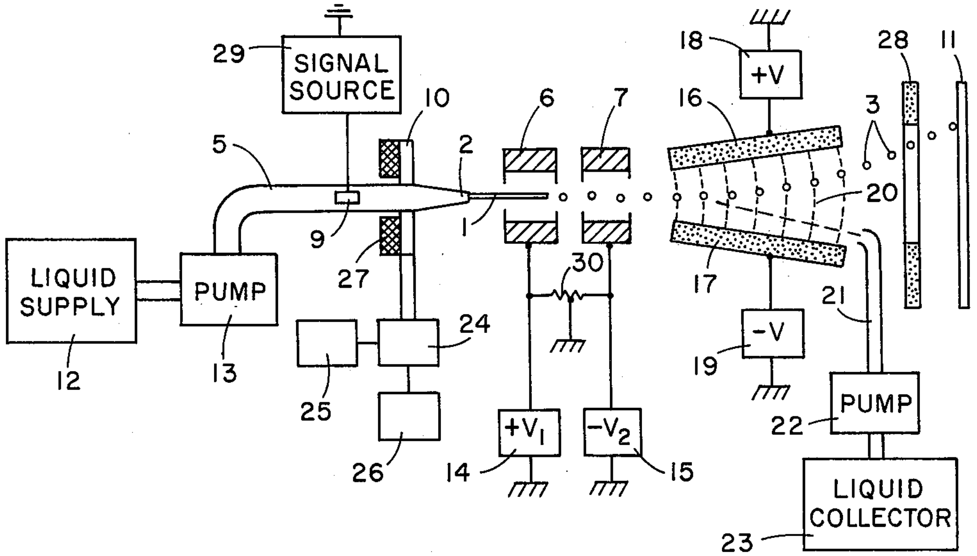

FIGS. 2 and 3 show one embodiment of apparatus suitable for controlling the direction of the liquid jet in accordance with this invention. Liquid from the supply means 12 is forced under pressure through nozzle 2 by the pump 13, which means that liquid jet 1 emerges at high speed from nozzle 2. Under the influence of mechanical vibrations from crystal 10 liquid jet 1 breaks up at drop formation point 4 into uniformly spaced droplets 3 of equal mass. Depending on the amplitude of the mechanical vibrations, the drop formation point will lie somewhere on the center lines or axes of the two annularly shaped electrodes 6 and 7 which in turn are connected to two voltage sources 14 and 15. In FIG. 2, these voltage sources are shown such that electrode 6 lies on a constant positive potential $V_1$ and electrode 7 on a constant negative potential $V_2$. However, it is, as will be shown, also possible to use other polarities and/or varying voltages. As detailed above, the position of drop formation point 4 determines the size of the electric charge on the drops.

As shown in the embodiment of FIGS. 2 and 3 the droplets 3, having a predetermined charge by virtue of their having been formed at a predetermined location in electric field 8, follow a path through an electric field 20 developed between the deflection electrodes 16 and 17 which in turn are connected to the voltage sources 18 and 19, respectively. This deflection field 20 lies essentially perpendicular to the liquid jet direction of travel. In the example given here, the deflection electrode 16 lies on a constant, highly positive voltage $+V_d$ and the electrode 17 on a constant, highly negative voltage $-V_d$. These polarities and voltages may of course, be varied. As droplets 3 traverse electric field 20 they may be deflected, the magnitude and direction of such deflection being dependent upon the electric charge on the droplets. Since this charge depends on the position of the drop formation point and consequently on the amplitude of the AC voltage exciting crystal 10, the droplet jet can be guided towards a predetermined point on receptor surface 11 by control of the AC voltage.

It is also, of course, possible to guide selected droplets which are not to reach receptor surface 11 into the drop interception device 21. Drop interceptor 21 is shown in FIG. 3 to comprise a tube connected by a suction pump 22 to the container 23 in which the liquid is collected. Container 23 can be connected to liquid supply 12 so that the writing liquid that does not reach the recording paper may be recirculated. Alternatively, the interception means may comprise a razor-sharp droplet cutoff device arranged to conduct the liquid into a collecting tube as described in U.S. Pat. No. 3,916,421.

The amplitude of the mechanical vibrations applied to the liquid in conduit 5, and consequently the final disposition of droplets 3 in receptor sheet 11, is controlled by the modulator 24. The amplitude of the AC voltage which excites crystal 10 is determined by modulator 24 and it is dependent on the signal voltage from the signal source 25. The AC voltage is generated by the oscillator 26 at a frequency approximating the resonance frequency of crystal 10 and the spontaneous frequency of drop formation of the liquid jet 1. Thus by a suitable shaping of the control signal from signal source 25, the droplets can be directed toward predetermined points on receptor surface paper 11 or into drop interceptor 21. If the receptor surface is moved at a constant speed essentially perpendicular to the axis of liquid jet 1 and to the deflection field, as shown by the direction of the arrow in FIG. 2, the droplet jet can be caused to draw an arbitrary curve, e.g., a saw-tooth curve, on the surface or to print alphanumeric characters or other figures, e.g., bar codes. A number of embodiments of the method and apparatus of this invention, along with modifications thereof are possible. Examples of such embodiments and modifications are given.

Operation of the apparatus, such as illustrated in FIGS. 2 and 3, indicates that it is important that the amplitude of the mechanical vibrations created by crystal 10 follows the time variations of the signal voltage without delay. Since crystal 10 tends to ring, this requirement is not automatically met. This fault can be remedied by attaching to crystal 10 a backing material 27 commonly used for the damping of crystals in ultrasound echo techniques. The use of such a backing material also has the advantage of broadening the resonance curve of the crystal in a way to permit the excitation of the crystal excited within a broad frequency band. This feature may be used to improve the efficiency of the system described in FIGS. 2 and 3 since a frequency change alters the size of the liquid droplets 3. Inasmuch as the smaller drops, having lesser mass, are deflected more in the electric field 20 than the larger ones, the deflection angle of liquid jet 1 can be changed by controlling the amplitude and the frequency of the AC current that excites the crystal. These alterations in amplitude and frequency may be made simultaneously or separately.

When liquid jet 1 strikes receptor sheet 11 at high speed a light liquid mist arises and it has a tendency to settle on electrodes 16 and 17 as well as on the apparatus components which maintain the electrodes in spaced relationship. To avoid this, a grounded shield 28 is introduced between the deflection electrodes 16 and 17 and the receptor sheet 11 to prevent the liquid mist from reaching the electrode system. It is preferable to construct electrodes 6, 7, 16 and 17, as well as shield 28, of a porous material that draws off possible liquid drops. With the aid of a suction pump such liquid drops can be drawn out of the porous material in a way similar to that described by Hertz et al in U.S. Pat. No. 3,416,153.

The following example illustrates a typical operation of the embodiment illustrated in FIGS. 2 and 3. The liquid jet with a diameter of 15 $\mu$m and a velocity of 30 meters per second, disperses about 800,000 droplets per second synchronously with the 800 kHz vibrations created by crystal 10. The distance between nozzle 2 and receptor surface 11 is about 30 millimeters. The two annularly shaped electrodes 6 and 7 are about 2 millimeters long and about 1 millimeter apart. Their inner diameter of each is 1 millimeter and they have +70 and −70 volt DC potential. The distance between deflection electrodes 16 and 17 is 3 to 4 millimeters in the immediate vicinity of electrode 7. This distance may, however, increase towards the paper serving as a receptor surface. The lengths of electrodes 16 and 17 are about 20 millimeters and their potentials are +3.5 and −3.5 kilovolts, respectively. With this arrangement, the jet can be deflected about +5 degrees from its original direction. Depending on the diameter and speed of liquid jet 1, these parameters can be varied over a relatively wide range, using essentially the same construction of the system as shown.

In the above-described embodiments, the point at which the liquid droplet jet finally strikes receptor surface 11 is determined solely by an electrical signal which controls the amplitude modulation of the excitation current to crystal 10. However, a modification of this embodiment permits the determination of this point by another signal which is independent of this first signal from signal source 25. This modification is made possible by the fact that the method and apparatus of this invention are based on the discovery that a change in the electric charge on droplets 3 can be effected by controllably changing the location of drop formation point 4 in electric field 8 in which the droplets are formed. This means that the geometrical position of drop formation point 4 or of electric field 8, or of both can be changed to change the charge on droplets 3.

In the above description and examples it has been assumed that electrode 9 and consequently also jet 1 are at ground potential. If, however, electrode 9 in FIG. 3 is connected to a new signal source 29, the potential of which can be varied with time, this new signal source can also affect the charge on droplets 3. This is due to the fact that the charge on the droplets is determined by the difference in potential between electric field 8 at the point of drop formation and electrodes 6 and 7. Thus it will be seen that this difference in potential can be directly controlled by the signal from signal source 25, by the signal from signal source 29, or by a combination of these signals. A similar control by another signal can be achieved if the two signal sources 14 and 15 which affect the electric field between electrodes 6 and 7, are controlled by an external signal source. Alternatively, the ground center tap on the resistor 30 can be manually or electrically adjusted to change the differences in potential between liquid jet 1 and electric field 8 between electrodes 6 and 7 at the drop formation point 4.

Inasmuch as uncorrected, externally caused operational parameters such as minor variations in the fluid pressure in conduit 5, in the piezoelectric properties of crystal 10, in the viscosity of the liquid forming the droplets, and the like, can cause a shifting of the drop formation point, it may be desirable to build servo control means into an ink-jet system incorporating the apparatus of this invention to minimize or eliminate such externally caused operational variations. The use of such a servo control means, as well as the choice of optimal operational parameters, for any particular system is within the skill of the art.

The incorporation of another signal source, i.e., source 29, to influence the trajectory of droplets 3 has several advantages. For example, it makes possible the modulation of the intensity of the printing trace independent of the curve shape initiated by signal source 25. The modulation of intensity may also be achieved in the manner described by Hertz et al in U.S. Pat. No. 3,416,153. Thus by placing a relatively large charge on the droplets an otherwise linear jet can be caused to dissolve into a spray of charged droplets which can be deflected in deflection field 20 to the extent that they are directed into the interceptor 21.

Alternatively, the modulation of the intensity may be achieved by using a porous diaphragm as described by Hertz et al in U.S. Pat. No. 3,416,153. If shield 28 is replaced by such a diaphragm, the orifice of which is situated exactly on the axis of the uncharged fluid jet, every droplet 3 having an electric charge will be caused to strike the diaphragm and it will be prevented from reaching receptor surface 11. This means that only those droplets free of any electric charge will be used in forming the pattern on the receptor surface. Thus a signal from source 25 and/or a change in electric field 8 at the drop formation point brought about through any of the mechanisms described above can be used to modulate the jet intensity at receptor surface 11. In using the method described by Hertz et al in U.S. Pat. No. 3,416,153, electrodes 16 and 17, along with interceptor 21, can be omitted completely.

Figure 5:
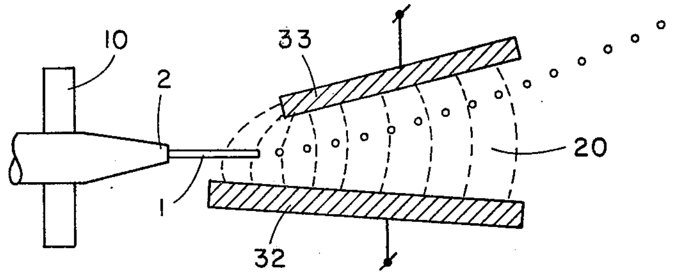
Figure 6:
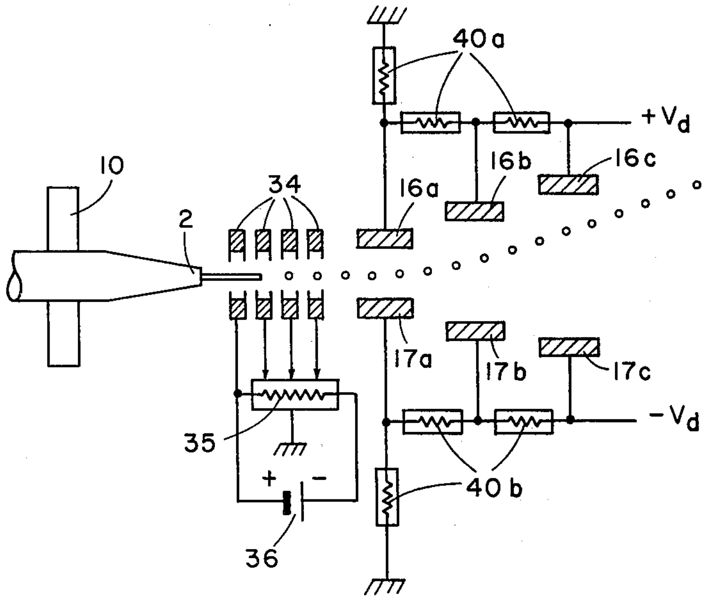
FIG. 6 is a cross sectional view of one modification of a portion of the apparatus of FIGS. 2 and 3, particularly the droplet control electrode means and deflection electrode means.

It is, of course, possible to vary the shape of the electrode system while maintaining the fundamental principle of the invention, namely moving the drop formation point relative to an electric field. FIGS. 4, 5, and 6 illustrate alternative modifications.

In FIG. 4 electrodes 7 and 17 are joined into one unit 31 which simplifies construction. The electrodes 6 and 31 are then connected to a DC voltage of +100 and −100, respectively and deflection electrode 16 is connected to a high positive voltage, e.g., 5 kV. The electrode system comprising electrodes 16 and 31 is similar to the combined electrode of U.S. Pat. No. 3,916,421. In FIG. 4 a portion of the signal control electrode forms part of the droplet directing electrode means while remaining distinct therefrom in function.

FIG. 5 shows that electrodes 6 and 7 can be completely eliminated if the deflection electrodes 32 and 33 are shaped asymmetrically so that an electric field gradient is created along the axis of jet 1. If the drop formation point is moved forward and backward along this field gradient as described above, the charge on the droplets, and thereby their trajectory in electric field 20, is changed. When using the arrangement of FIG. 5 it is important that the deflection plates 32 and 33 have suitable geometrical shapes and are on about equal potential, but of opposite polarity, so that the electric potential is zero at some point along the direction of the jet. This is necessary in order to be able to move the drop formation point of the normally grounded fluid jet to a position where the potential of the electric field is zero so that droplets 3 are not charged and thus can travel straight ahead through the electric field 20.

Finally, FIG. 6 illustrates that it is possible to divide electrodes 6 and 7, as well as deflection electrodes 16 and 17 (FIGS. 2 and 3), into several small electrodes. This can be advantageous for reasons which differ for the two types of electrodes. The replacement of electrodes 6 and 7 of FIGS. 2 and 3 with a number of electrode rings 34 provides a system in which the electric field generating the charge on droplets 3 is better defined. The potentials of the different electrodes 34 can be chosen independent of each other with the aid of sliding taps on the resistor 35 over which the voltage of the voltage source 36 drops. Alternatively, these voltages may be electronically controlled. In this way the field dispersion along the axis of jet 1, which is important for determining the location of the drop formation, can be chosen in an optimal way. Electrodes 34 can also be replaced by a conductive coil of a material with high electric resistance. If the two end points of such a coil are connected to voltage source 36, an almost linear potential drop arises within the coil along its axis along which the locii of drop formation points can be moved back and forth.

In FIG. 6 deflection electrodes 16 and 17 (FIGS. 2 and 3) are also shown to be divided to illustrate that this can be an advantage in certain cases. Due to the curved form of the jet trajectory it is sometimes necessary to incline electrodes 16 and 17 towards the axis of the jet as indicated in FIG. 3. This means that the field power of deflection field 20 is reduced along the jet axis in the direction of receptor surface 11. By dividing deflection electrodes 16 and 17 into, for example, three smaller electrodes (16*a–c* and 17*a–c* as shown in FIG. 6), field 20 can be maintained essentially constant if the potentials of electrodes 16*a–c* and 17*a–c* are chosen in a suitable way, for example, with the aid of the resistor chains 40*a* and 40*b*, respectively.

In accordance with yet another modification which may be incorporated into the method and apparatus of this invention as illustrated in FIGS. 2 and 3, an auxiliary electrode, connected to an AC voltage source having the same frequency as the droplet formation frequency, may be positioned to apply voltage very near nozzle 2. (See, for example, U.S. Pat. No. 3,596,275). By controlling the amplitude of the AC voltage from an input signal to such an electrode it is also possible to control the drop formation point and hence the charge on the droplets in the stream.

FIGS. 7 and 8 are perspective and side elevational views, respectively, of another embodiment of this invention. In this embodiment, conduit 5 is turned on its axis 41 by any suitable mechanism (see for example U.S. Pat. No. 2,566,443 to Elmqvist) to impart an oscillatory motion to nozzle 2 and hence to liquid jet 1. Such oscillatory motion thus causes the drop formation point to move in an arc. By controlling the electric field along this arc, the charge on droplets 3 will depend upon the location of the drop formation points when the drops were formed. Hence it is possible to locate the locii of drop formation along an arc. In this embodiment the electric field can be controlled, for example, by a number of electrode pairs 37*a–d*. In the electrode pair 37*a* each of the two electrodes is connected to a voltage source, i.e., 38*a* and 39*a*. The voltage of sources 38*a* and 39*a* determines the potential along the arc of drop formation points between the two electrodes. In the same way, the electrode pairs 37*b–d* are connected to their respective voltage sources 38*c–d* and 39*c–d* which in turn determine the potential at the position of the arc between the electrode pairs 37*b–d*. (The voltage sources 38*b*, 38*c*, 39*b*, and 39*c*, have been omitted in FIG. 7 to simplify it.)

As will be seen from FIGS. 7 and 8, it is evident that the electric potential generally varies along the arc describing the drop formation point 4 when the nozzle 2 is turned about axis 41. This means that the charges on droplets 3 are dependent upon the positions of the drop formation point at the moment when the droplets are formed along the arcuate potential gradient, in accordance with the principle of this invention.

It is therefore obvious that the principle of this invention is not dependent upon the form or the number of electrodes between which electric field 8 is created. The shapes of these electrodes may be adjusted to the requirements of each special case. Likewise, the magnitudes and polarities of the electric voltages which are connected to these electrodes and to fluid jet 1, by way of electrode 9 in conduit 5, as well as the signal source or sources employed to shift the drop formation point may be adjusted from system to system. It will therefore be appreciated that a number of embodiments and modifications of this invention, other than those illustrated, are possible.

FIG. 9 illustrates the use of a compound jet (as described in U.S. Pat. No. 4,196,437) in the practice of this invention. In this system, a primary propelling fluid jet 42 emerges from nozzle 2 under high pressure. Nozzle 2 is positioned in an almost stationary secondary fluid 43 which is transferred from a supply source 44 by a pump 45 into the housing 46. The housing 46 has an orifice 48 across which the secondary fluid is maintained by surface tension so that there is provided a thin layer of the secondary fluid having a free stream discharge surface. Primary liquid jet 42, as it passes through secondary liquid 43, entrains part of the secondary fluid to create a so-called compound jet which passes through orifice 48 as a compound liquid stream which breaks up into compound droplets 3. The location of the drop formation point 47 of this compound jet can be moved relative to the electric field in the manner previously described. The use of a compound jet is applicable to any of the embodiments and modifications of this invention as hereinbefore described. It is within the scope of this invention to arrange a plurality of fluid jet systems adjacent to each other and to control the drop formation points of the different fluid jets independent of each other through electric signals in the same way as described for a single fluid jet.

Many different fluids, other than ink, suitable for a recording system can be used to create the liquid jet and be controlled as herein described. Receptor surface 11 may be any suitable surface such as paper, glass, metal, plastic or the like. The arrangements described in FIGS. 1–9 are therefore only examples of different ways to realize the invention and many different embodiments of the invention are possible.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

I claim:

1. A method of providing a stream of liquid droplets which carry thereon electric charges of predetermined magnitude and polarity, comprising the steps of (a) providing an electrically conductive liquid jet which breaks up at a drop formation point to form liquid droplets;
(b) providing an electric field, through which said droplets are directed, having an electric potential gradient; and
(c) controlling the location of said drop formation point within said electric field along said gradient thereby to control the electric charge on said droplets.

2. A method in accordance with claim 1 wherein said electric potential gradient is defined along an arc and said method includes the step of oscillating said liquid jet whereby the locii of said drop formation points lie along said arc.

3. A method in accordance with claim 1 wherein said electric potential gradient is along the path travelled by said liquid jet through said field.

4. A method in accordance with claim 3 including the step of imposing on said liquid forming said jet mechanical vibrations at a frequency approximating that at which said droplets are formed.

5. A method in accordance with claim 4 wherein said step of controlling the location of said drop formation point comprises varying the amplitude at which said mechanical vibrations are imposed.

6. A method in accordance with claim 5 wherein said step of controlling the location of said drop formation point includes varying the potential difference between said liquid and said electric field.

7. A method in accordance with claim 6 wherein said step of varying said potential difference comprises applying a variable electric charge on said liquid.

8. A method in accordance with claim 6 wherein said step of varying said potential difference comprises varying the potential of said electric field.

9. A method in accordance with claim 1 wherein said step of controlling the location of said drop formation point comprises varying the potential difference between the liquid forming said jet and said electric field.

10. A method in accordance with claim 1 including the step of directing said liquid jet through a thin layer of a different secondary fluid having a free stream discharge surface to form a compound liquid stream before reaching said drop formation point.

11. A method of ink-jet printing, comprising the steps of (a) forcing an electrically conductive liquid under pressure through a nozzle to form a jet of said liquid which breaks up into a jet of liquid droplets at a drop formation point;
(b) directing said liquid jet through an electric field having an electric potential gradient;
(c) controlling the location of said drop formation point within said electric field along said gradient thereby to place on said droplets electrical charges of predetermined polarity and magnitude; and
(d) electrically controlling the direction of travel of the charged droplets whereby selected ones of said droplets are directed onto a receptor surface in a predetermined pattern.

12. A method in accordance with claim 11 wherein said electric potential gradient is defined along an arc and said method includes the step of oscillating said nozzle whereby the locii of said drop formation points lie along said arc.

13. A method of ink-jet printing, comprising the steps of (a) directing an electrically conductive liquid under pressure through a nozzle to form a jet of said liquid which breaks up into a jet of liquid droplets at a drop formation point;
(b) directing said liquid jet through an electric field having an electric potential gradient along the path travelled by said liquid jet through said field;
(c) controlling the location of said drop formation point within said electric field along said gradient, thereby to place on said droplets electrical charges of predetermined polarity and magnitude; and
(d) electrically controlling the direction of travel of the charged droplets whereby selected ones of said droplets are directed onto a receptor surface in a predetermined pattern.

14. A method in accordance with claim 13 including the step of imposing on said liquid as it is being supplied to said nozzle mechanical vibrations at a frequency approximating that at which said droplets are formed.

15. A method in accordance with claim 14 wherein said step of controlling the location of said drop formation point comprises varying the amplitude at which said mechanical vibrations are imposed.

16. A method in accordance with claim 15 wherein said step of controlling the location of said drop formation point comprises varying the amplitude and the frequency at which said mechanical vibrations are imposed.

17. A method in accordance with claim 15 wherein said step of controlling the location of said drop formation point includes varying the potential difference between said liquid and said electric field.

18. A method in accordance with claim 17 wherein said step of varying said potential difference comprises applying a variable electric charge on said liquid.

19. A method in accordance with claim 17 wherein said step of varying said potential difference comprises varying the potential of said electric field.

20. A method in accordance with claim 14 wherein said step of controlling the location of said drop formation point comprises varying the potential difference between said liquid and said electric field.

21. A method in accordance with claim 13 wherein said step of electrically controlling said direction of travel of said charged droplets comprises directing said charged droplets through an electric deflecting field, whereby the magnitude and direction of deflection experienced by said droplets is dependent upon the electric charge on said droplets.

22. A method in accordance with claim 13 wherein said step of electrically controlling said direction of travel of said charged droplets comprises directing said charged droplets through an electric field arranged to effect the scattering and collection of all of said droplets except those free of an electrical charge.

23. A method in accordance with claim 13 including the step of directing said jet of said liquid through a thin layer of a different secondary fluid having a free stream discharge surface to form a compound liquid stream before reaching said drop formation point.

24. An apparatus for providing a stream of liquid droplets having predetermined electrical charges thereon, comprising, in combination (a) nozzle means;

(b) means to eject a liquid jet under pressure from said nozzle means on a manner to break up said liquid jet into droplets at a drop formation point thereby to form a jet of liquid droplets;

(c) droplet control electrode means arranged to define an electric field through which said liquid jet is directed and in which said drop formation point is located, said electric field having an electric potential gradient;

(d) means to control the location of said drop formation point within said electric field along said gradient thereby to control the electric charge on said droplets.

25. An apparatus in accordance with claim 24 wherein said potential gradient of said field is defined along an arc and said apparatus includes means for oscillating said liquid jet, whereby the locii of said drop formation points lie along said arc.

26. An apparatus in accordance with claim 24 wherein said potential gradient is along the path travelled by said liquid jet through said field.

27. An apparatus in accordance with claim 24 including means for imposing on said liquid forming said jet mechanical vibrations at a frequency approximating that at which said droplets are formed.

28. An apparatus in accordance with claim 27 wherein said means to control the location of said drop formation point comprises means to vary the amplitude at which said mechanical vibrations are imposed.

29. An apparatus in accordance with claim 27 wherein said means to control the location of said drop formation point comprise means to vary the amplitude and the frequency at which said mechanical vibrations are imposed.

30. An apparatus in accordance with claim 28 wherein said means to control the location of said drop formation point includes means to vary the potential difference between said liquid and said electric field.

31. An apparatus in accordance with claim 30 wherein said means to vary said potential difference comprises means to apply a variable electric charge on said liquid.

32. An apparatus in accordance with claim 30 wherein said means to vary said potential difference comprises means to vary the potential of said electric field.

33. An apparatus in accordance with claim 24 wherein said means to control said drop formation point comprises means to vary the potential difference between the liquid forming said jet and said electric field.

34. An apparatus in accordance with claim 24 including means to direct said liquid jet through a thin layer of a different secondary fluid having a free stream discharge surface to form a compound liquid stream before reaching said drop formation point.

35. An apparatus for ink-jet printing, comprising in combination (a) nozzle means;

(b) means to define an electric droplet charging field having an electric potential gradient;

(c) means to supply under pressure an electrically conductive liquid from a source through conduit means and through said nozzle thereby to form a liquid jet which travels through said electric field and which breaks up into liquid droplets at a drop formation point located within said electric field;

(d) means to control the location of said drop formation point within said electric field along said gradient thereby to place on said droplets electrical charges of predetermined polarity and magnitude;

(e) receptor surface means; and (f) droplet directing electrode means to control the direction of travel of said droplets whereby selected ones of said droplets are directed onto said receptor surfaces in a predetermined pattern.

36. An apparatus in accordance with claim 35 wherein said means to define an electric droplet charging field has an electric potential gradient defined along an arc and said apparatus includes means to oscillate said nozzle whereby the locii of said drop formation points lie along said arc.

37. An apparatus in accordance with claim 36 wherein said means to define said electric charging field comprises a plurality of spaced apart pairs of electrodes arranged in an arcuate configuration, each of said pairs of electrodes having means to define between them a portion of said field.

38. An apparatus in accordance with claim 35 wherein said electric potential gradient is defined along the path travelled by said liquid jet through said field whereby the locii of said drop formation points lie along said path.

39. An apparatus in accordance with claim 38 wherein said means to define said droplet charging field comprises a plurality of annularly configured electrodes and voltage source means to establish said electric potential gradient.

40. An apparatus in accordance with claim 39 including signal source means arranged to control said voltage source means whereby the magnitude of said potential may be varied along said gradient.

41. An apparatus in accordance with claim 38 wherein said means to define said droplet charging field and said droplet directing electrode means are combined.

42. An apparatus in accordance with claim 38 including means associated with said conduit to impose on said liquid as it is being supplied to said nozzle mechanical vibrations at a frequency approximating that at which said droplets are formed.

43. An apparatus in accordance with claim 42 wherein said means to control the location of said drop formation point comprises means to vary the amplitude at which said mechanical vibrations are imposed.

44. An apparatus in accordance with claim 42 wherein said means to control the location of said drop formation point comprises means to vary the amplitude and the frequency at which said mechanical vibrations are imposed.

45. An apparatus in accordance with claim 43 wherein said means to vary said amplitude comprises variable signal source means.

46. An apparatus in accordance with claim 43 wherein said means to control the location of said drop formation point include means to vary the potential difference between said liquid and said electric field.

47. An apparatus in accordance with claim 43 wherein said means to vary said potential difference comprises means to apply a variable electric charge on said liquid.

48. An apparatus in accordance with claim 47 wherein said means to apply a variable electric charge on said liquid comprises variable signal source means.

49. An apparatus in accordance with claim 43 wherein said means to vary said potential difference comprises means to vary the potential of said electric field.

50. An apparatus in accordance with claim 49 wherein said means to vary the potential of said electric field comprises variable signal source means.

51. An apparatus in accordance with claim 43 wherein said means to control the location of said drop formation point comprises means to vary the potential difference between said liquid and said electric field.

52. An apparatus in accordance with claim 35 wherein said droplet directing electrode means comprises means defining an electric deflecting field whereby the magnitude and direction of deflection experienced by said droplets is dependent upon the electric charge on said droplets.

53. An apparatus in accordance with claim 52 wherein said means defining an electric deflecting field comprises spaced apart electrodes and means to establish an electric potential between them; and said apparatus comprises a grounded shield means between said electrodes and said receptor surface.

54. An apparatus in accordance with claim 52 wherein said means defining an electric deflecting field comprise a plurality of spaced electrode pairs, the spacing between said pairs increasing with increasing distance from said drop formation point, and means to maintain an electric potential between the electrodes of each pair of such magnitudes that the potential along the direction of droplet travel through said electric deflecting field is maintained essentially constant.

55. An apparatus in accordance with claim 35 wherein said droplet directing electrode means comprises electric field defining means arranged to effect the scattering and collection of all of said droplets except those free of an electrical charge.

56. An apparatus in accordance with claim 55 wherein said electric field defining means comprise spaced apart porous electrodes having vacuum pump means associated therewith to draw the scattered droplets therethrough into collection means.

57. An apparatus in accordance with claim 35 including means to direct said jet of said liquid through a thin layer of a different secondary fluid having a free stream discharge surface to form a compound liquid stream before reaching said drop formation point.

* * * * *